(12) United States Patent
Yoshinaga

(10) Patent No.: US 9,939,609 B2
(45) Date of Patent: Apr. 10, 2018

(54) LENS SYSTEM, INTERCHANGEABLE LENS DEVICE, AND CAMERA SYSTEM

(71) Applicant: Panasonic Intellectual Property Management Co., Ltd., Osaka (JP)

(72) Inventor: Shunichiro Yoshinaga, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/408,570

(22) Filed: Jan. 18, 2017

(65) Prior Publication Data
US 2017/0219795 A1    Aug. 3, 2017

(30) Foreign Application Priority Data

Feb. 3, 2016  (JP) .................................. 2016-018576
Dec. 15, 2016  (JP) .................................. 2016-242806

(51) Int. Cl.
| | |
|---|---|
| G02B 9/04 | (2006.01) |
| G02B 15/14 | (2006.01) |
| G02B 7/105 | (2006.01) |
| H04N 5/225 | (2006.01) |
| H04N 5/232 | (2006.01) |
| G02B 13/00 | (2006.01) |
| G02B 9/64 | (2006.01) |

(52) U.S. Cl.
CPC .............. G02B 7/105 (2013.01); G02B 9/64 (2013.01); G02B 13/006 (2013.01); H04N 5/2253 (2013.01); H04N 5/2254 (2013.01); H04N 5/23293 (2013.01)

(58) Field of Classification Search
CPC ...... G02B 15/14; G02B 15/16; G02B 15/161; G02B 13/003; G02B 9/04; G02B 9/06
USPC .................... 359/691, 717, 748, 793, 794
See application file for complete search history.

(56) References Cited

U.S. PATENT DOCUMENTS

2013/0188091 A1* 7/2013 Hara ..................... G02B 15/22
                                                             348/345

FOREIGN PATENT DOCUMENTS

| JP | 2009-205063 | 9/2009 |
| JP | 2011-048232 | 3/2011 |

* cited by examiner

*Primary Examiner* — William Choi
(74) *Attorney, Agent, or Firm* — Wenderoth, Lind & Ponack, L.L.P.

(57) ABSTRACT

A lens system in the present disclosure includes: a first lens group that is moved toward an image side along an optical axis in focusing from a far-object in-focus state to a near-object in-focus state, and has positive optical power; and a second lens group that is disposed on the image side relative to the first lens group and has optical power. The lens system satisfies the following conditions (1) and (2).

$$0.5 < |fg1/WD| < 2.0 \tag{1}$$

$$20 < |fg2/f| < 700 \tag{2}$$

where
fg1 is a focal length of the first lens group,
WD is a distance, on the optical axis, from an object surface to a lens surface located closest to an object side of the first lens group,
fg2 is a focal length of the second lens group, and
f is a focal length of the lens system under the far-object in-focus state.

8 Claims, 10 Drawing Sheets

LENS SYSTEM, INTERCHANGEABLE LENS DEVICE, AND CAMERA SYSTEM

BACKGROUND

1. Technical Field

The disclosure relates to a lens system, an interchangeable lens device, and a camera system.

2. Description of the Related Art

An interchangeable-lens type of digital camera system (hereinafter, merely referred to as "a camera system") can advantageously take high-sensitive and high-quality images, and perform high-speed focusing and image processing after taking a photograph. Besides, the camera system can easily change an interchangeable lens device according to a desired scene. In recent years, the interchangeable-lens type of digital camera system has been spreading rapidly.

Conventionally, various kinds of compact lens systems with good optical performance have been proposed as a lens system used for the interchangeable lens device.

Patent Literature 1 discloses a lens system that has good optical performance at approximately 1-times magnification and can compensate an image blur caused when the lens system vibrates.

On the other hand, a lens system used for a microscope whose magnification is approximately 10 to 20 times is also proposed variously.

Patent Literature 2 discloses an objective lens system for a microscope whose magnification is 15 to 20 times. The lens system has a high numerical aperture, fully compensates aberrations, and has a flat image surface and a wide scope.

CITATION LIST

Patent Literature

PTL1: Unexamined Japanese Patent Publication No. 2011-48232
PTL2: Unexamined Japanese Patent Publication No. 2009-205063

SUMMARY

However, in the optical system described in Patent Literature 1, magnifying power is as low as approximately 1-times. Accordingly, the optical system is insufficient to take still pictures and videos for minute photographic objects such as a microorganism and textiles of paper (hereafter referred to as microscope photography).

In the optical system described in Patent Literature 2, to perform focus adjustment, a photographic object is necessary to be held on a stage, or a camera system is necessary to be moved in an optical axis direction. Thus, there is such a problem that the optical system is difficult to perform simple focusing.

A lens system in the present disclosure includes: a first lens group that is moved toward an image side along an optical axis in focusing from a far-object in-focus state to a near-object in-focus state, and has positive optical power; and a second lens group that is disposed on the image side relative to the first lens group and has optical power. The lens system satisfies the following conditions (1) and (2).

$$0.5 < |fg1/WD| < 2.0 \tag{1}$$

$$20 < |fg2/f| < 700 \tag{2}$$

where
fg1 is a focal length of the first lens group,
WD is a distance, on the optical axis, from an object surface to a lens surface located closest to an object side of the first lens group,
fg2 is a focal length of the second lens group, and
f is a focal length of the lens system under the far-object in-focus state.

An interchangeable lens device in the present disclosure includes a lens system, and a lens mount part capable of connecting to a camera body that includes an image element for receiving an optical image formed by the lens system and converting the optical image into an electric image signal. In focusing from a far-object in-focus state to a near-object in-focus state, the lens system is moved toward an image side along an optical axis. The lens system includes a first lens group that has positive optical power, and a second lens group that is disposed on the image side relative to the first lens group, and has optical power. The lens system satisfies the following conditions (1) and (2).

$$0.5 < |fg1/WD| < 2.0 \tag{1}$$

$$20 < |fg2/f| < 700 \tag{2}$$

where
fg1 is a focal length of the first lens group,
WD is a distance, on the optical axis, from an object surface to a lens surface located closest to an object side of the first lens group,
fg2 is a focal length of the second lens group, and
f is a focal length of the lens system under the far-object in-focus state.

A camera system in the present disclosure includes an interchangeable lens device, and a camera body that is detachably connected to the interchangeable lens device via a camera mount part, and includes an image element for receiving an optical image formed by the lens system and converting the optical image into an electric image signal. In focusing from a far-object in-focus state to a near-object in-focus state, the lens system is moved toward an image side along an optical axis. The lens system includes a first lens group that has positive optical power, and a second lens group that is disposed on the image side relative to the first lens group and has optical power. The lens system satisfies the following conditions (1) and (2).

$$0.5 < |fg1/WD| < 2.0 \tag{1}$$

$$20 < |fg2/f| < 700 \tag{2}$$

where
fg1 is a focal length of the first lens group,
WD is a distance, on the optical axis, from an object surface to a lens surface located closest to an object side of the first lens group,
fg2 is a focal length of the second lens group, and
f is a focal length of the lens system under the far-object in-focus state.

The present disclosure provides a lens system whose magnification is approximately 10 to 20 times, which is suitable for microscope photography and enables simple focusing with high definition.

DETAILED DESCRIPTION OF THE PREFERRED EMBODIMENTS

Hereinafter, exemplary embodiments will be described in detail, with reference to the drawings as necessary. However, descriptions more detailed than necessary may be omitted. For example, detailed description of already well known matters or description of substantially identical configurations may be omitted. This is intended to avoid redundancy in the description below, and to facilitate understanding of those skilled in the art.

It should be noted that the applicants provide the attached drawings and the following description such that those skilled in the art can fully understand the present disclosure. Therefore, the drawings and description are not intended to limit the subject defined by the claims.

In the present disclosure, a lens group is a group constituted by at least one lens element. For every lens groups, optical power, composite focal length, and the like are determined depending on a type of lens elements, the number of lens elements, arrangement of lens elements, and the like, which constitute the lens group.

FIRST TO THIRD EXEMPLARY EMBODIMENTS

Figure 1:
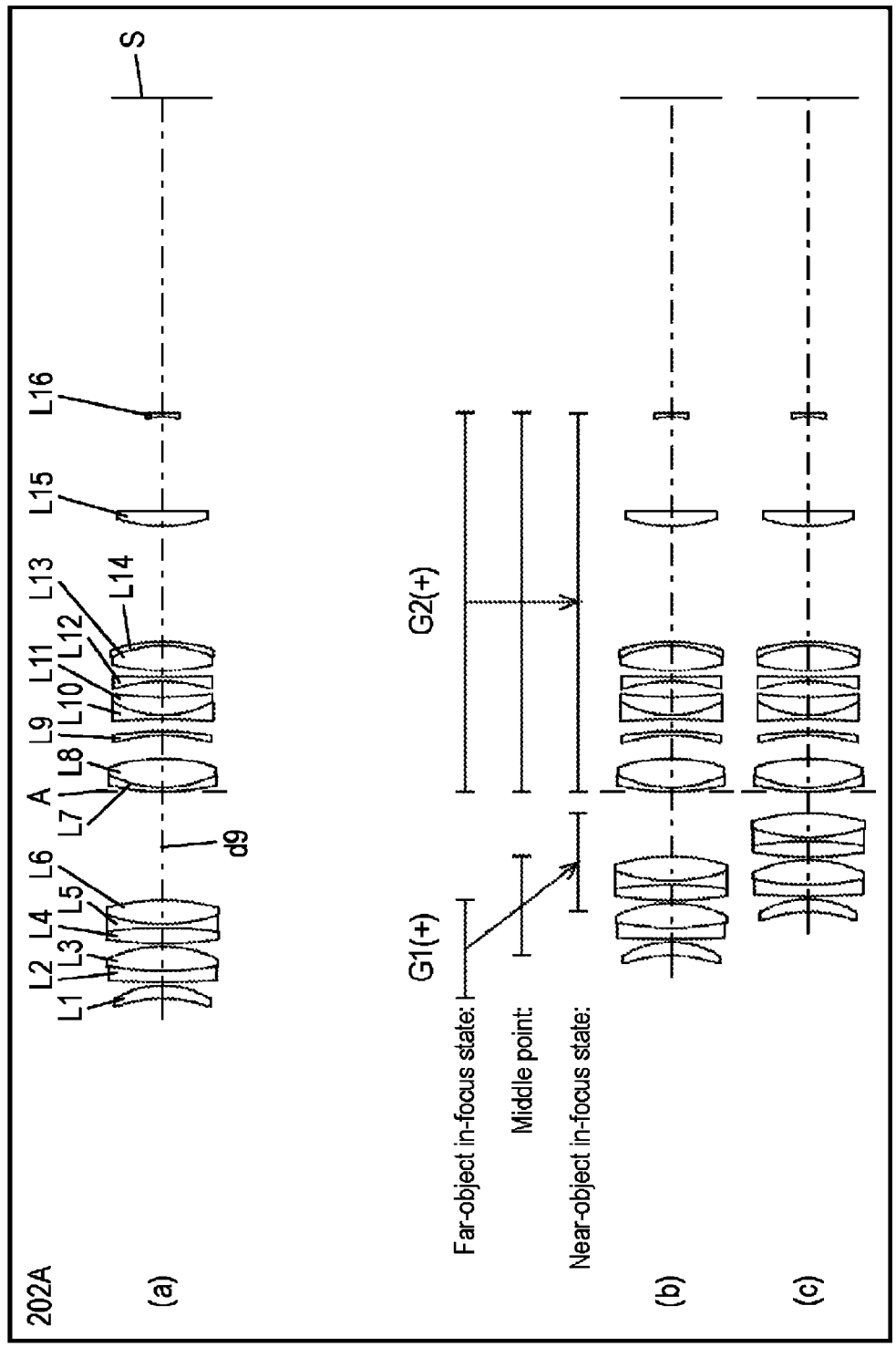
FIG. 1 is a lens arrangement diagram of a lens system in accordance with a first exemplary embodiment (first numerical practical example)
Figure 4:
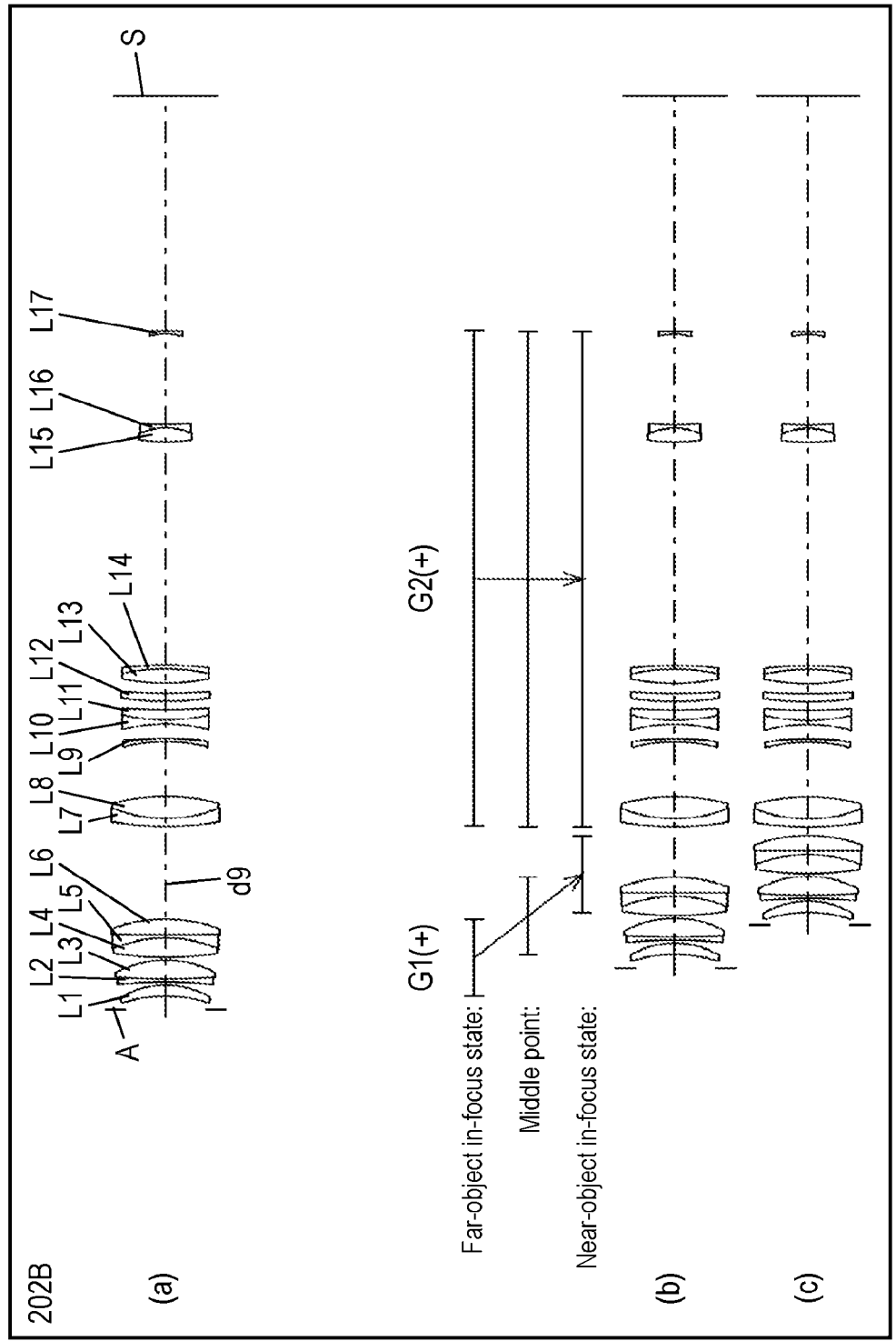
FIG. 4 is a lens arrangement diagram of a lens system in accordance with a second exemplary embodiment (second numerical practical example)
Figure 7:
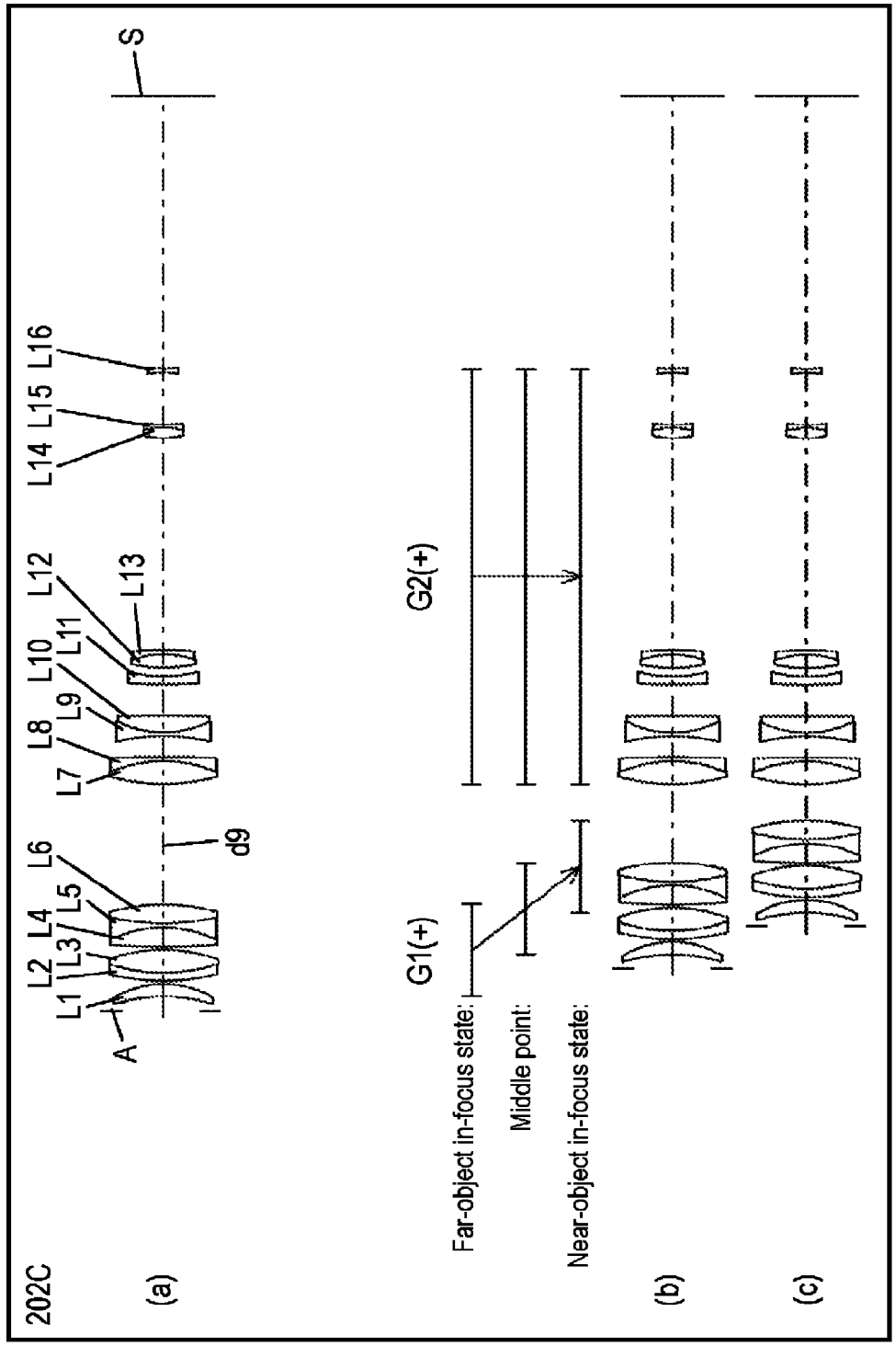
FIG. 7 is a lens arrangement diagram of a lens system in accordance with a third exemplary embodiment (third numerical practical example)

FIGS. 1, 4, and 7 are lens arrangement diagrams of lens systems 202A to 202C in accordance with first to third exemplary embodiments, respectively. In FIGS. 1, 4, and 7, (a) shows a lens arrangement diagram in the state where a far-object is focused, (b) shows a lens arrangement diagram in the state where a near-object is focused, and (c) shows a lens arrangement diagram in the state where an object disposed at a middle point therebetween is focused. Note that, lens systems 202A to 202C may be collectively referred to as lens system 202.

In FIGS. 1, 4, and 7, an arrow provided between (a) and (b) represents a straight line obtained by connecting center positions of the lens group in focusing from a far-object in-focus state to a near-object in-focus state. That is, the arrow illustrates that first lens group G1, described later, is moved in focusing from a far-object in-focus state to a near-object in-focus state. Distance d9 shown in FIGS. 1, 4, and 7 indicates a distance between first lens group G1 and second lens group G2. Distance d9 decreases as the center position of first lens group G1 is moved from a far-object in-focus state to a near-object in-focus state.

In each diagram, the sign (+), which is assigned to the numeral of each lens group, corresponds to a sign of optical power of each lens group. In each diagram, a straight line located on the most right-hand side indicates a position of image surface S.

The lens systems in accordance with the first to third exemplary embodiments each include first lens group G1 having positive optical power and second lens group G2 having positive optical power, in order from an object side to an image side. Note that, in the first to third exemplary embodiments, second lens group G2 having positive optical power will be described, but second lens group G2 may have negative optical power.

First Exemplary Embodiment

As shown in FIG. 1, in order from an object side to an image side, first lens group G1 of lens system 202A includes first lens element L1 having a positive meniscus shape with a convex surface facing the image side, second lens element L2 having a negative meniscus shape with a convex surface facing the object side, third lens element L3 having a bi-convex shape, fourth lens element L4 having a bi-convex shape, fifth lens element L5 having a bi-concave shape, and sixth lens element L6 having a bi-convex shape.

Among these, second lens element L2 and third lens element L3 are cemented with each other, and fourth lens element L4, fifth lens element L5, and sixth lens element L6 are cemented with one another.

In order from the object side to the image side, second lens group G2 of lens system 202A includes aperture stop A, seventh lens element L7 having a negative meniscus shape with a convex surface facing the object side, eighth lens element L8 having a bi-convex shape, ninth lens element L9 having a negative meniscus shape with a convex surface facing the image side, tenth lens element L10 having a bi-concave shape, eleventh lens element L11 having a positive meniscus shape with a convex surface facing the object side, twelfth lens element L12 having a bi-concave shape, thirteenth lens element L13 having a bi-convex shape, fourteenth lens element L14 having a negative meniscus shape with a convex surface facing the image side, fifteenth lens element L15 having a convex-plane shape with a convex surface facing the object side, and sixteenth lens element L16 having a negative meniscus shape with a convex surface facing the image side.

Among these, seventh lens element L7 and the eighth lens element L8 are cemented with each other, tenth lens element L10 and eleventh lens element L11 are cemented with each other, and thirteenth lens element L13 and fourteenth lens element L14 are cemented with each other.

In focusing from a far-object in-focus state to a near-object in-focus state, second lens group G2 is fixed relative to image surface S, and first lens group G1 serving as a focusing lens group is moved toward the image side along an optical axis.

Note that, tenth lens element L10, eleventh lens element L11, and twelfth lens element L12 correspond to a lens group (hereafter, referred to as a decentered lens group) that is moved in a direction perpendicular to the optical axis to track a photographic object or compensate an image blur optically.

Second Exemplary Embodiment

As shown in FIG. 4, in order from an object side to an image side, first lens group G1 of lens system 202B includes aperture stop A, first lens element L1 having a positive meniscus shape with a convex surface facing the image side, second lens element L2 having a bi-concave shape, third lens element L3 having a bi-convex shape, fourth lens element L4 having a bi-convex shape, fifth lens element L5 having a bi-concave shape, and sixth lens element L6 having a bi-convex shape.

Among these, second lens element L2 and third lens element L3 are cemented with each other, and fourth lens element L4, fifth lens element L5, and sixth lens element L6 are cemented with one another.

In order from the object side to the image side, second lens group G2 of lens system 202B includes seventh lens element L7 having a negative meniscus shape with a convex surface facing the object side, eighth lens element L8 having a bi-convex shape, ninth lens element L9 having a negative meniscus shape with a convex surface facing the image side, tenth lens element L10 having a bi-concave shape, eleventh lens element L11 having a positive meniscus shape with a convex surface facing the object side, twelfth lens element L12 having a positive meniscus shape with a convex surface facing the object side, thirteenth lens element L13 having a bi-convex shape, fourteenth lens element L14 having a negative meniscus shape with a convex surface facing the image side, fifteenth lens element L15 having a bi-convex shape, sixteenth lens element L16 having a bi-concave shape, and seventeenth lens element L17 having a negative meniscus shape with a convex surface facing the image side.

Among these, seventh lens element L7 and eighth lens element L8 are cemented with each other, tenth lens element L10 and eleventh lens element L11 are cemented with each other, thirteenth lens element L13 and fourteenth lens element L14 are cemented with each other, and fifteenth lens element L15 and sixteenth lens element L16 are cemented with each other.

In focusing from a far-object in-focus state to a near-object in-focus state, second lens group G2 is fixed relative to image surface S, and first lens group G1 serving as a focusing lens group is moved toward the image side along an optical axis.

Note that, tenth lens element L10, eleventh lens element L11, and twelfth lens element L12 correspond to a decentered lens group.

Third Exemplary Embodiment

As shown in FIG. 7, in order from an object side to an image side, first lens group G1 of lens system 202C includes aperture stop A, first lens element L1 having a positive meniscus shape with a convex surface facing the image side, second lens element L2 having a negative meniscus shape with a convex surface facing the object side, third lens element L3 having a bi-convex shape, fourth lens element L4 having a bi-convex shape, fifth lens element L5 having a bi-concave shape, and sixth lens element L6 having a bi-convex shape.

Among these, second lens element L2 and third lens element L3 are cemented with each other, and fourth lens element L4, fifth lens element L5, and sixth lens element L6 are cemented with one another.

In order from the object side to the image side, second lens group G2 of lens system 202C includes seventh lens element L7 having a bi-convex shape, eighth lens element L8 having a negative meniscus shape with a convex surface facing the image side, ninth lens element L9 having a bi-concave shape, tenth lens element L10 having a bi-convex shape, eleventh lens element L11 having a negative meniscus shape with a convex surface facing the object side, twelfth lens element L12 having a bi-convex shape, thirteenth lens element L13 having a negative meniscus shape with a convex surface facing the image side, fourteenth lens element L14 having a bi-convex shape, fifteenth lens element L15 having a bi-concave shape, and sixteenth lens element L16 having a bi-concave shape.

Among these, seventh lens element L7 and eighth lens element L8 are cemented with each other, ninth lens element L9 and tenth lens element L10 are cemented with each other, twelfth lens element L12 and thirteenth lens element L13 are cemented with each other, and fourteenth lens element L14 and fifteenth lens element L15 are cemented with each other.

In focusing from a far-object in-focus state to a near-object in-focus state, second lens group G2 is fixed relative to image surface S, and first lens group G1 serving as a focusing lens group is moved toward the image side along an optical axis.

Note that, ninth lens element L9, tenth lens element L10, and eleventh lens element L11 correspond to a decentered lens group.

The lens systems in accordance with the first to third exemplary embodiments each have first lens group G1 having positive optical power and second lens group G2 having optical power, in order from the object side to the image side. This makes it possible to compensate aberrations sufficiently while the entire optical length remains short, thereby achieving a clear lens system with highly efficient performance, even in a circumference part.

In the lens systems in accordance with the first to third exemplary embodiments, first lens group G1 is moved in an optical axis direction relative to an image surface in focusing from a far-object in-focus state to a near-object in-focus state. Thus, simple focusing can be achieved while a photographic object and a camera system remain fixed.

In the lens systems in accordance with the first to third exemplary embodiments, optical surfaces of fourth lens element L4, fifth lens element L5, and sixth lens element L6 are cemented with one another to form a cemented lens element. Thus, a chromatic aberration can be compensated suitably. Besides, a deterioration in imaging performance due to decentering errors can be prevented.

In the lens systems in accordance with the first to third exemplary embodiments, first lens element L1, which is disposed closest to an object side of first lens group G1, has a positive meniscus shape with a convex surface facing the image side. Thus, occurrence of a spherical aberration can be prevented to obtain excellent imaging performance.

Like the lens systems in accordance with the first to third exemplary embodiments, it is useful to provide a decentered lens group. By providing the decentered lens group, movement of an image point due to vibration of the entire system can be compensated. Further, a photographic object moving in an optical axis direction can be tracked such that its optical image stays within an effective image circle.

In compensating the movement of an image point due to vibration of the entire system, if an image-blur compensating lens group is moved in a direction perpendicular to the optical axis, an image blur will be compensated in the state where excellent imaging characteristics is maintained while a decentering coma aberration and decentering astigmatism remain small. At this time, the entire lens system is also prevented from increasing in size to make the structure compact.

If the decentered lens group is moved in a direction perpendicular to an optical axis, an optical image will be moved in the direction perpendicular to the optical axis as a photographic object moves in the direction perpendicular to the optical axis. This makes it possible to track the photographic object moving in the direction perpendicular to the optical axis such that its optical image stays in an effective image circle.

As mentioned above, the first to third exemplary embodiments have been described as examples of the art disclosed in the present application. However, the art in the present disclosure is not limited to this, but may be applied to exemplary embodiments in which modifications, replacements, additions, omissions, and the like are performed as necessary.

Hereinafter, possible conditions satisfied by a lens system, like the lens systems in accordance with the first to third exemplary embodiments, will be described. Note that, a plurality of possible conditions are specified for lens systems in accordance with the respective exemplary embodiments, but the most effective structure of the lens system is to satisfy all of these conditions. However, even if the conditions are satisfied individually, the lens system can obtain effects corresponding to the individual conditions.

For instance, like the lens systems in accordance with the first to third exemplary embodiments, a lens system includes first lens group G1 having positive optical power and second lens group G2 having optical power, in order from an object side to an image side. Herein, first lens group G1 is a focusing lens group that is moved in an optical axis direction relative to an image surface, in focusing from a far-object in-focus state to a near-object in-focus state (hereafter, this lens structure is referred to as a basic structure of the exemplary embodiment). The lens system satisfies the following conditions (1) and (2).

$$0.5 < |fg1/WD| < 2.0 \tag{1}$$

$$20 < |fg2/f| < 700 \tag{2}$$

where fg1 is a focal length of first lens group G1,

WD is a distance, on the optical axis, from an object surface to a lens surface located closest to an object side of first lens group G1, fg2 is a focal length of second lens group G2, and f is a focal length of the lens system under the far-object in-focus state.

Condition (1) is a condition that specifies a focal length of first lens group G1 and a distance, on the optical axis, from an object surface to a lens surface located closest to an object side of the optical system.

When |fg1/WD| is less than the lower limit of condition (1), the ray height entering first lens group G1 becomes high, so that a spherical aberration occurred in first lens group G1 is compensated insufficiently. When |fg1/WD| exceeds the upper limit of condition (1), the ray emitted from first lens group G1 becomes a divergent light flux or a convergence light flux. As a result, when first lens group G1 is moved in the optical axis direction, a positional point of an object viewed from second lens group G2 varies. This makes it difficult to obtain allowable aberrations occurred in the second lens group G2, not depending on the position of first lens group G1.

When |fg2/f| is less than the lower limit of condition (2), magnifying power of the lens system is decreased and becomes unsuitable for microscope photography. When |fg2/f| exceeds the upper limit of condition (2), aberrations occurred in second lens group G2, such as a chromatic aberration and a spherical aberration, are difficult to be compensated.

By satisfying at least one of the following conditions (1A) and (1B), the above-mentioned effects can further be enhanced.

$$1.0 < |fg1/WD| < 2.0 \tag{1A}$$

$$0.5 < |fg1/WD| < 1.5 \tag{1B}$$

By satisfying at least one of the following conditions (2A) and (2B), the above-mentioned effects can further be enhanced.

$$25 < |fg2/f| < 700 \tag{2A}$$

$$20 < |fg2/f| < 500 \tag{2B}$$

Like the lens systems in accordance with the first to third exemplary embodiments, for example, a lens system having the basic structure satisfies the following conditions (3) and (4).

$$1.7 < ndA \tag{3}$$

$$13 < vdA \tag{4}$$

where, ndA is a refractive index of first lens element L1 disposed closest to the object side at d line, and vdA is an Abbe number of first lens element L1 disposed closest to the object side at d line.

When ndA is less than the lower limit of condition (3), a spherical aberration occurred in first lens element L1 is increased, thereby deteriorating its imaging performance.

When vdA is less than the lower limit of condition (4), a chromatic aberration occurred in first lens element L1 is increased, thereby deteriorating its imaging performance.

By satisfying the following condition (3A), the above-mentioned effects can further be enhanced.

$$1.85 < ndA \tag{3A}$$

By satisfying the following condition (4A), the above-mentioned effects can further be enhanced.

$$17 < vdA \tag{4A}$$

Like the lens systems in accordance with the first to third exemplary embodiments, for example, a lens system having the basic structure satisfies the following conditions (5).

$$1.0 < (R1A + R2A)/(R1A - R2A) < 15 \tag{5}$$

where,

R1A is a curvature radius of a surface on an object side of first lens element L1 disposed closest to the object side, and R2A is a curvature radius of a surface on an image side of first lens element L1 disposed closest to the object side.

When (R1A+R2A)/(R1A−R2A) is less than the lower limit of condition (5) or exceeds the upper limit of condition (5), a spherical aberration occurred in first lens element L1 is increased, thereby deteriorating its imaging performance.

By satisfying at least one of the following conditions (5A) and (5B), the above-mentioned effects can further be enhanced.

$$2.0 < (R1A + R2A)/(R1A - R2A) < 15 \tag{5A}$$

$$1.0 < (R1A + R2A)/(R1A - R2A) < 6.0 \tag{5B}$$

Like the lens systems in accordance with the first to third exemplary embodiments, for example, a lens system having the basic structure satisfies the following condition (6).

$$0.1 < t2max/Tg2 < 0.8 \tag{6}$$

where, t2max is the maximum value of distances, on the optical axis, between lens elements in second lens group G2, and Tg2 is a distance, on an optical axis, from a lens surface located closest to the object side to a lens surface located closest to the image side, of second lens group G2.

When t2max/Tg2 is less than the lower limit of condition (6), an image surface curve is difficult to be compensated, thereby deteriorating its imaging performance. When t2max/Tg2 exceeds the upper limit of condition (6), a spherical aberration is difficult to be compensated, thereby deteriorating its imaging performance.

By satisfying at least one of the following conditions (6A) and (6B), the above-mentioned effects can further be enhanced.

$$0.2 < t2max/Tg2 < 0.8 \quad (6A)$$

$$0.1 < t2max/Tg2 < 0.6 \quad (6B)$$

Like the lens systems in accordance with the first to third exemplary embodiments, for example, a lens system having the basic structure satisfies the following conditions (7), $$-3.0 < fg1/fL < -1.0 \quad (7)$$

where, fg1 is a focal length of first lens group G1, and fL is a focal length of first lens element L1.

When fg1/fL is less than the lower limit of condition (7), an image surface curve occurred in first lens element L1 is increase, thereby deteriorating its imaging performance. When fg1/fL exceeds the upper limit of condition (7), the lens system is difficult to be used as a telephoto type, thereby making it difficult to be miniaturized.

By satisfying at least one of the following conditions (7A) and (7B), the above-mentioned effects can further be enhanced.

$$-2.5 < fg1/fL < -1.0 \quad (7A)$$

$$-3.0 < fg1/fL < -1.5 \quad (7B)$$

Only a refraction type of lens element, which deflects an incident ray through refraction (namely, a type of lens element in which deflection is performed at an interface between mediums having different refractive indexes from each other), is employed to constitute each lens group configuring the lens systems in accordance with the first to third exemplary embodiments, but is not limited to this. For instance, each lens group may be constituted by a diffraction type of lens element that deflects an incident ray through diffraction, a refraction-diffraction hybrid type of lens element that deflects an incident ray through a combination of a diffraction effect and a refraction effect, a refractive-index distribution type of lens element that deflects an incident ray through refractive-index distribution in a medium, or the like. Especially, in the refraction-diffraction hybrid type of lens element, it is useful to form diffraction structure in the interface between mediums having different refractive indexes from each other, because wavelength dependency of diffraction efficiency is improved.

Fourth Exemplary Embodiment

Figure 10:
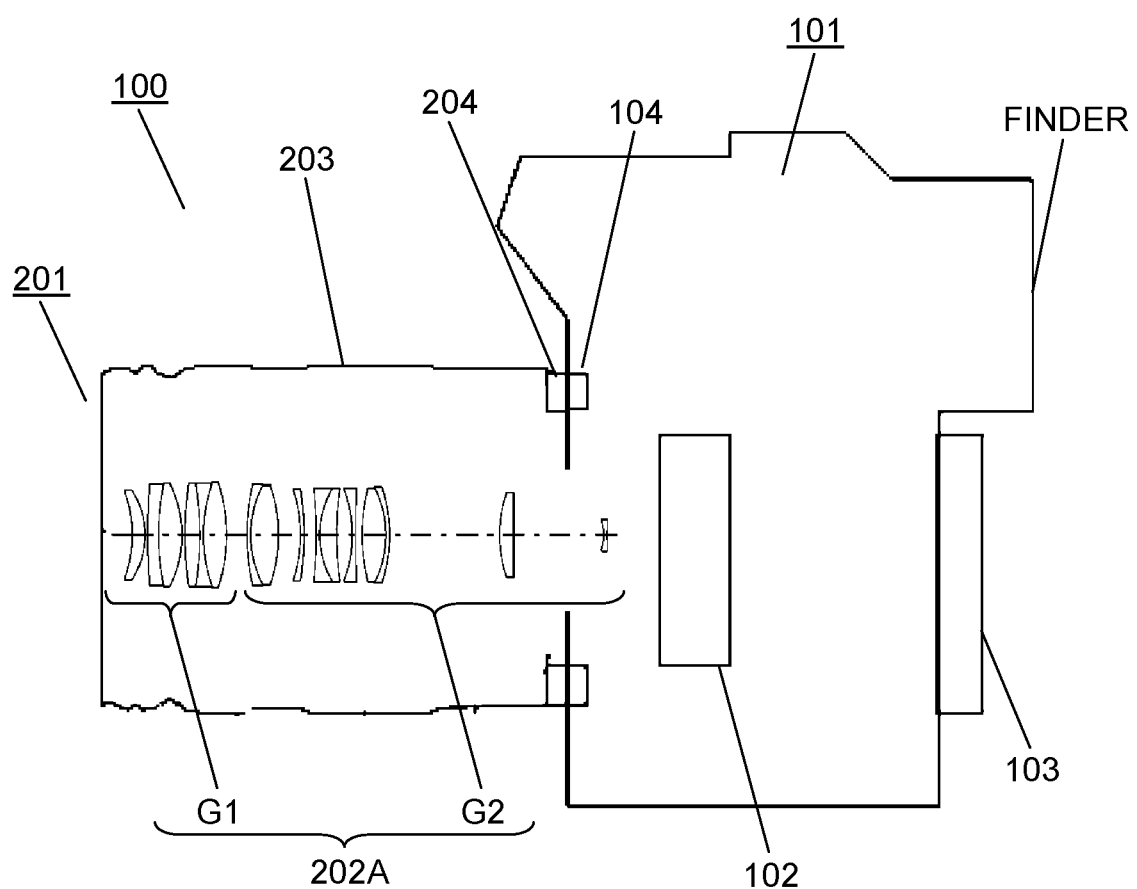
FIG. 10 is a schematic construction diagram of a digital camera system of an interchangeable-lens type in accordance with a fourth exemplary embodiment.

FIG. 10 is a schematic construction diagram of a digital camera system of an interchangeable-lens type in accordance with a fourth exemplary embodiment.

Digital camera system 100 of an interchangeable-lens type in accordance with the fourth exemplary embodiment includes camera body 101, and interchangeable lens device 201 detachably connected to camera body 101.

Camera body 101 includes image element 102 for receiving an optical image formed by lens system 202 of interchangeable lens device 201 and converting the optical image into an electric image signal, liquid-crystal display monitor 103 for displaying the image signal converted by image element 102, and camera mount part 104.

On the other hand, interchangeable lens device 201 includes lens system 202 in accordance with any one of the first to third exemplary embodiments, barrel 203 for holding lens system 202, and lens mount part 204 connected to camera mount part 104 of camera body 101. Camera mount part 104 and lens mount part 204 connect a controller (not shown) in camera body 101 to a controller (not shown) in interchangeable lens device 201 physically and electrically. Thus, camera mount part 104 and lens mount part 204 also function as an interface for enabling mutual communication of signals therebetween. Note that, FIG. 10 shows the case where lens system 202A in accordance with the first exemplary embodiment is used as lens system 202.

In the fourth exemplary embodiment, lens system 202 in accordance with any one of the first to third exemplary embodiments is used. This makes it possible to achieve compact interchangeable lens device 201 that has excellent imaging performance and enables simple focusing at low cost. Further, digital camera system 100 of an interchangeable-lens type in accordance with the fourth exemplary embodiment can perform miniaturization and cost reduction as a whole.

As mentioned above, the fourth exemplary embodiment is described as an example of the art disclosed in the present application. However, the art in the present disclosure is not limited to this, but may be applied to exemplary embodiments in which modifications, replacements, additions, omissions, and the like are performed as necessary.

A first to third numerical practical examples indicate the case where lens systems 202A to 202C in accordance with the first to third exemplary embodiments are practically used, respectively. Hereinafter, the numerical practical examples will be described. For each numerical practical example, all lengths in the tables are expressed in "mm" units, and all view angles are expressed in "o" units. Further, in each numerical practical example, r indicates a curvature radius, d indicates a distance between faces, nd indicates a refractive index with respect to d line, and vd indicates an Abbe number with respect to d line.

Figure 2:
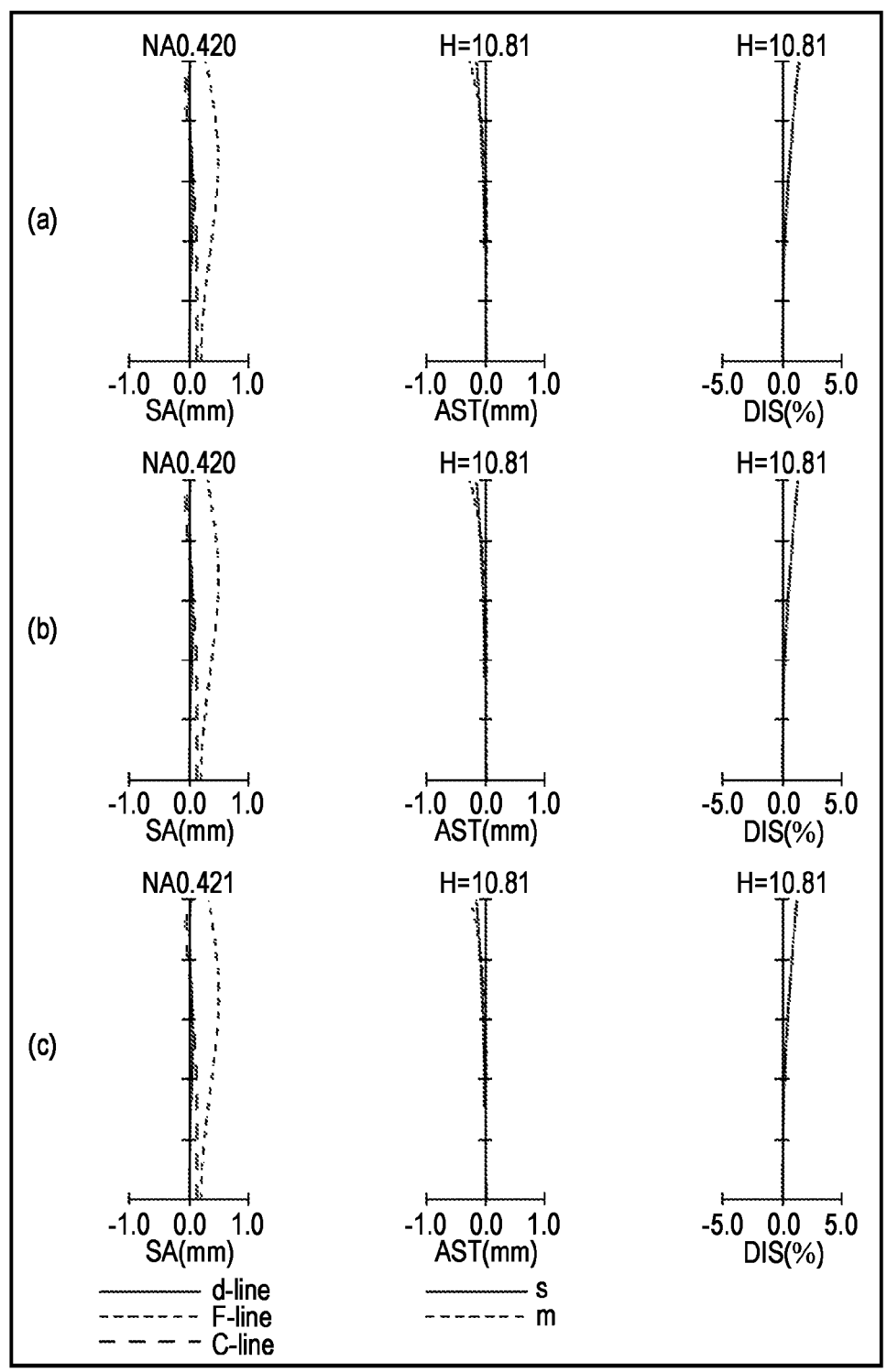
FIG. 2 is a longitudinal aberration diagram of the lens system in accordance with the first numerical practical example.
Figure 5:
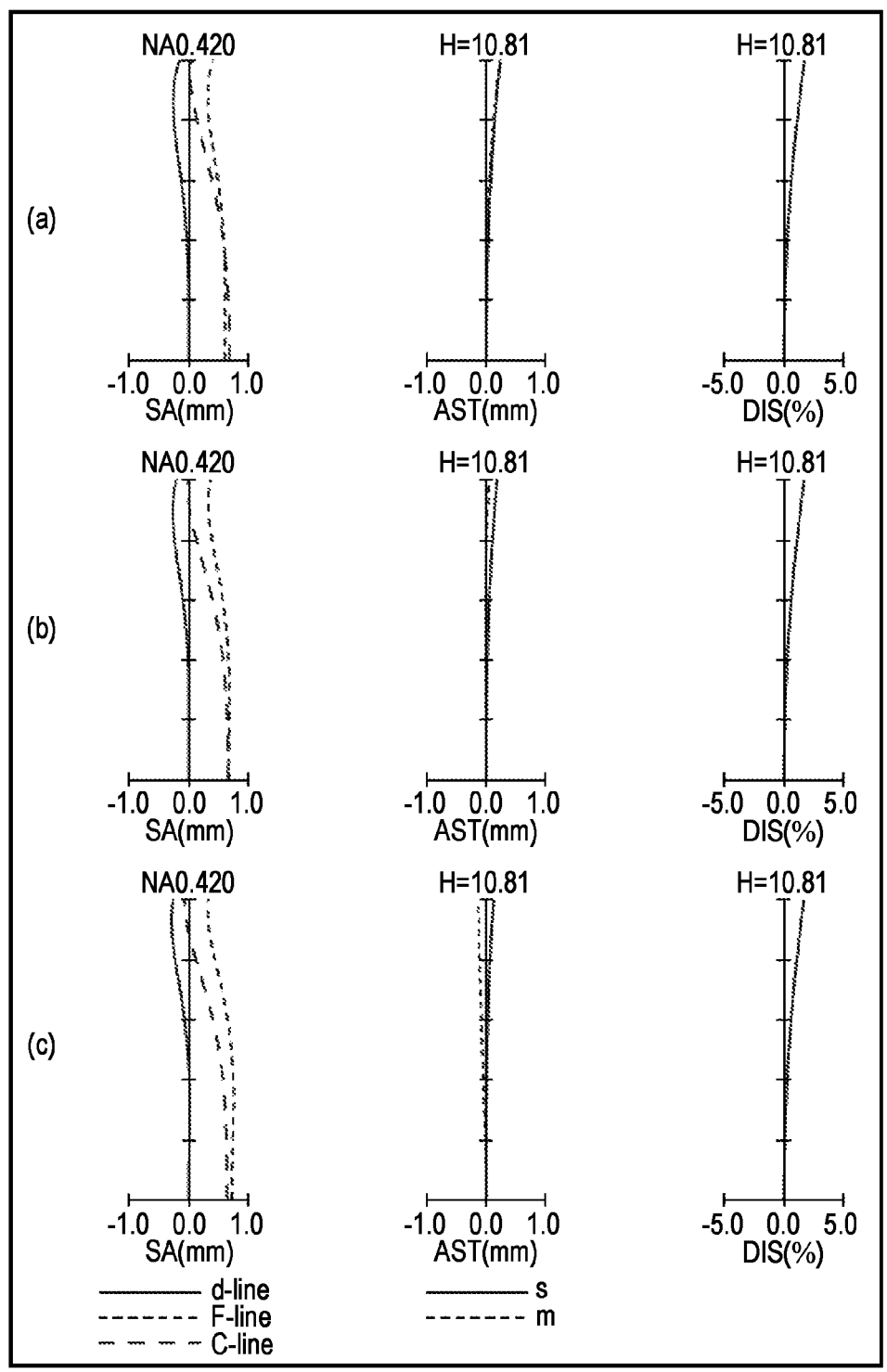
FIG. 5 is a longitudinal aberration diagram of the lens system in accordance with the second numerical practical example.
Figure 8:
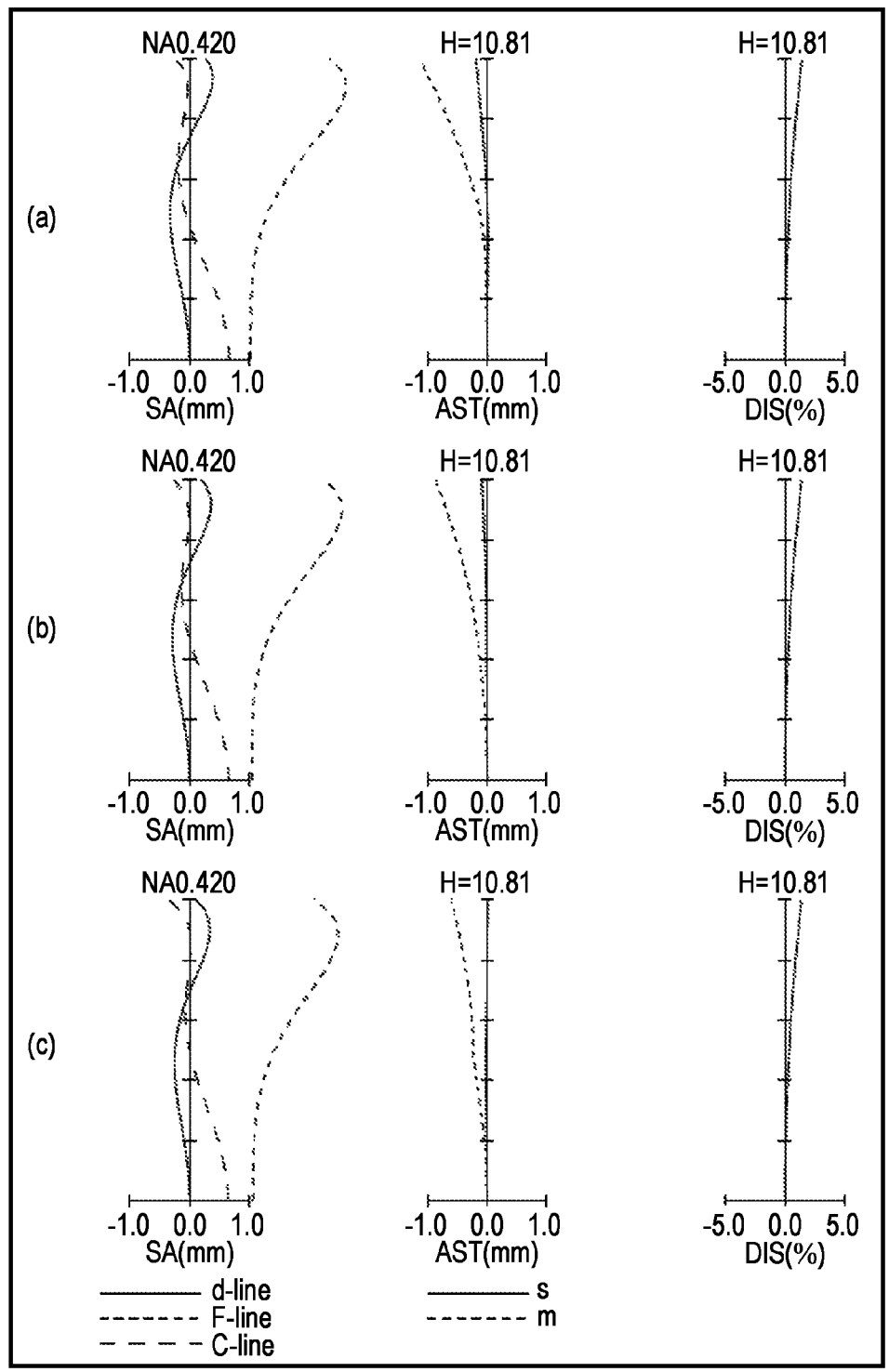
FIG. 8 is a longitudinal aberration diagram of the lens system in accordance with the third numerical practical example.

FIGS. 2, 5, and 8 are longitudinal aberration diagrams of lens systems 202A to 202C in accordance with the first to third numerical practical examples, respectively.

In FIGS. 2, 5, and 8, (a) shows an aberration in the state where a far-object is focused, (c) shows an aberration in the state where a near-object is focused, and (b) shows an aberration in the state where an object located at a middle point therebetween is focused. In the respective longitudinal aberration diagrams, in order from the left-hand side, a spherical aberration (SA (mm)), astigmatism (AST (mm)), and a distortion aberration (DIS (%)) are shown. In the spherical aberration diagram, a vertical axis shows a numerical aperture (shown by NA in the diagram), and a solid line indicates characteristics of d line (d-line), a short dashed line indicates characteristics of F line (F-line), and a long dashed line indicates characteristics of C line (C-line). In the astigmatism diagram, a vertical axis shows image height (shown by H in the diagram), and a solid line indicates characteristics of a sagittal plane (shown by s in the diagram), and a dashed line indicates characteristics of a meridional plane (shown by m in the diagram). In the distortion aberration diagram, a vertical axis shows image height (shown by H in the diagram).

Figure 3:
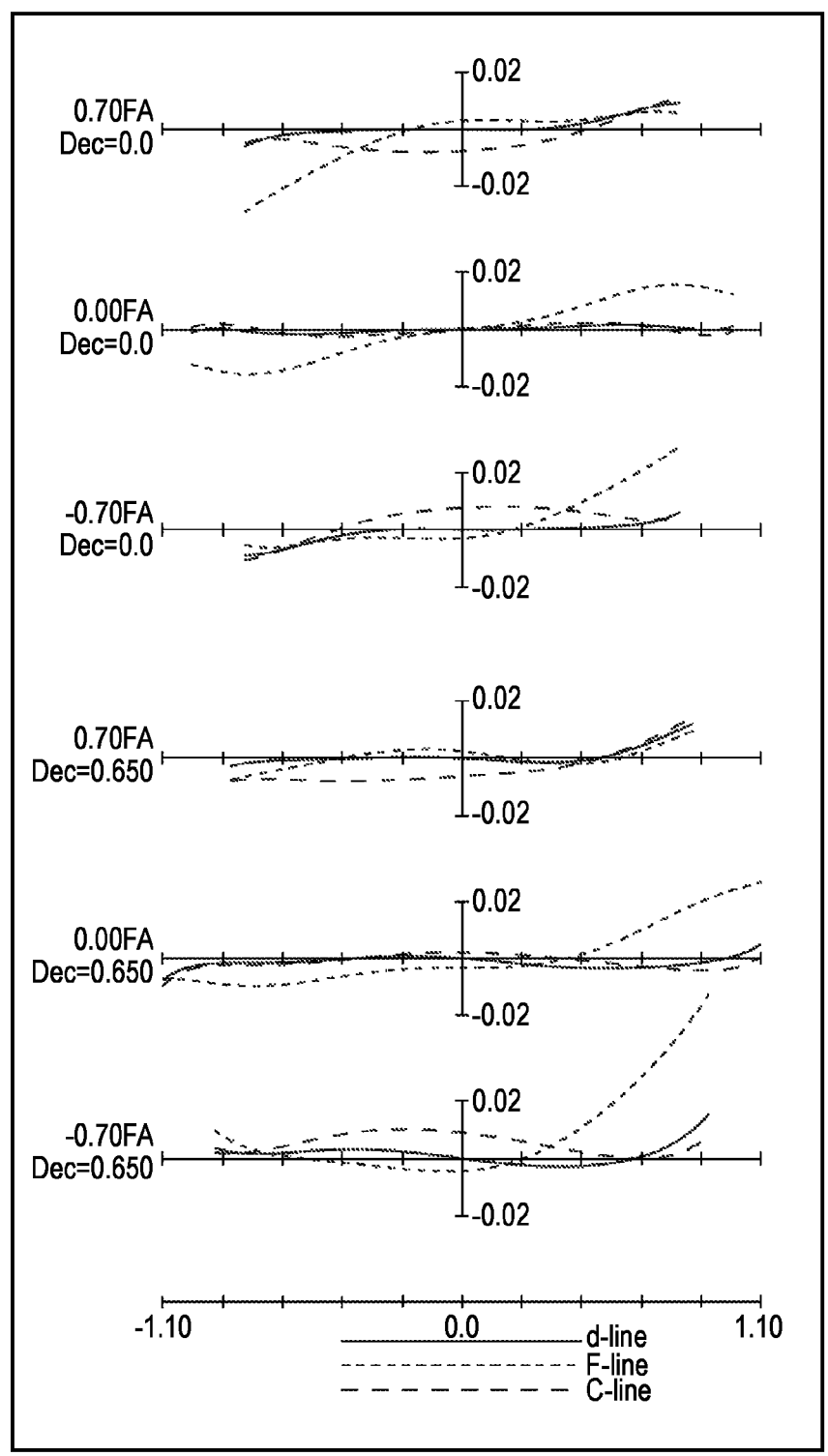
FIG. 3 is a lateral aberration diagram under a far-object in-focus state of the lens system in accordance with the first numerical practical example.
Figure 6:
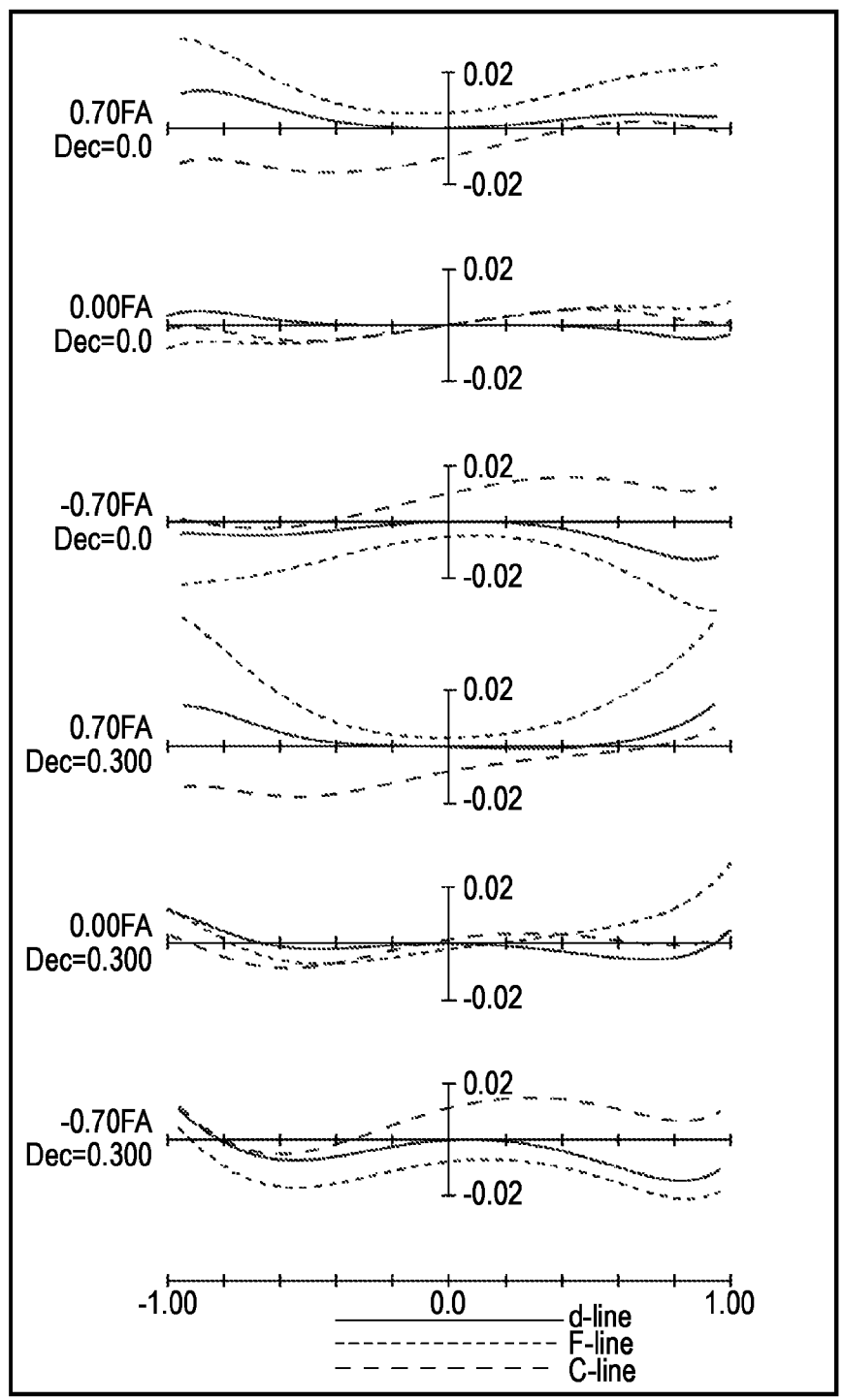
FIG. 6 is a lateral aberration diagram under a far-object in-focus state of the lens system in accordance with the second numerical practical example.
Figure 9:
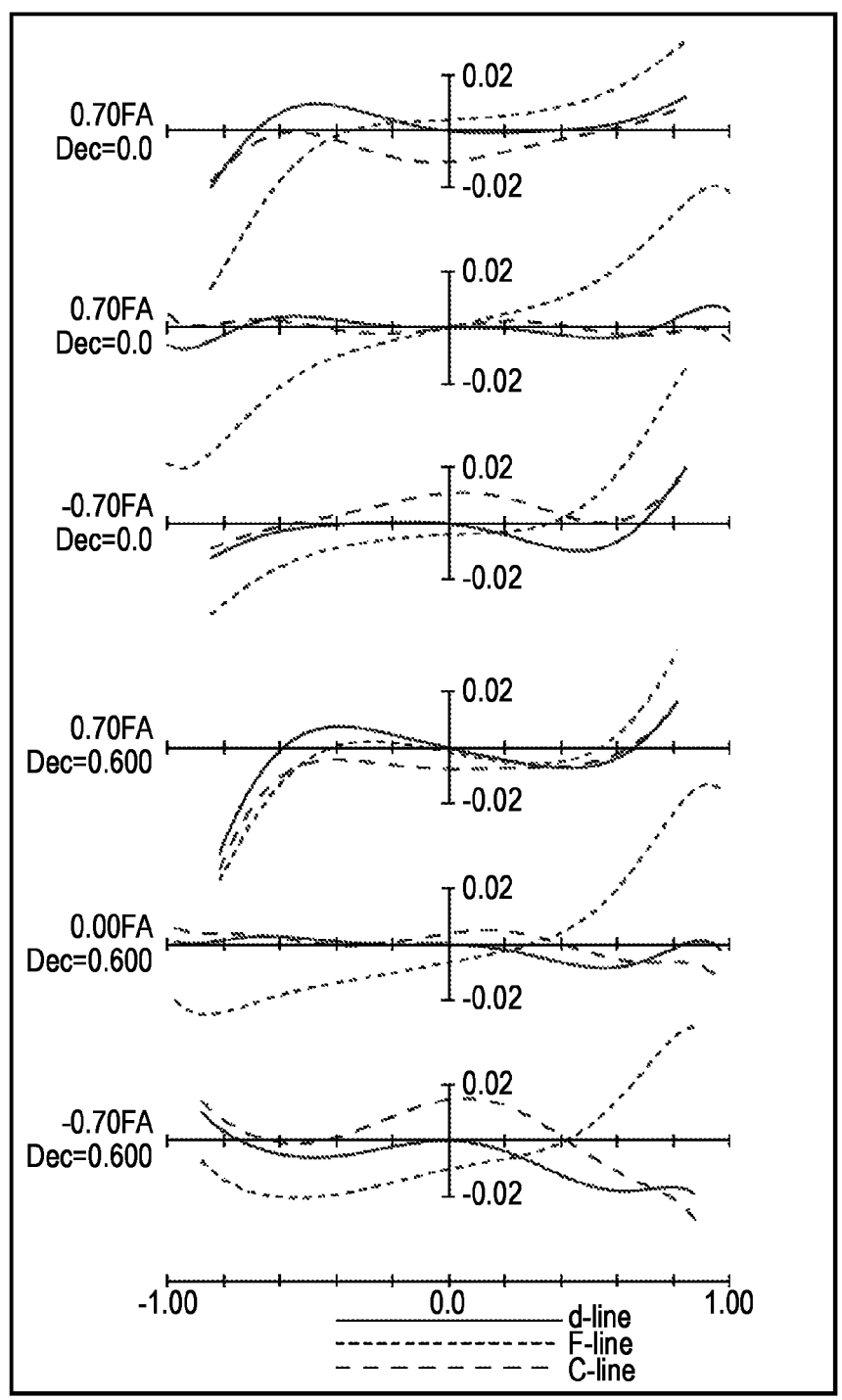
FIG. 9 is a lateral aberration diagram under a far-object in-focus state of the lens system in accordance with the third numerical practical example.

FIGS. 3, 6 and 9 are lateral aberration diagrams of lens systems 202A to 202C in accordance with the first to third numerical practical examples in the state where a far-object is focused, respectively.

In FIGS. 3, 6, and 9, above the three lateral aberration diagrams correspond to the state (primitive state) where an image blur is not compensated under a far-object in-focus state or a photographic object is not tracked. Below the three lateral aberration diagrams correspond to the state (compensation state) where an image blur is compensated under a far-object in-focus state or a photographic object is tracked. For the lateral aberration diagrams in the primitive state, the upper diagram corresponds to lateral aberration at an image point with 70% of the maximum image height, the middle diagram corresponds to lateral aberration at an image point on the axis, and the lower diagram corresponds to lateral aberration at an image point with −70% of the maximum image height. For the lateral aberration diagrams in the compensation state, the upper diagram corresponds to lateral aberration at an image point with 70% of the maximum image height, the middle diagram corresponds to lateral aberration at an image point on the axis, and the lower diagram corresponds to lateral aberration at an image point with −70% of the maximum image height. Further, in each lateral aberration diagram, a horizontal axis shows a distance from a principal ray on a pupil plane, and a solid line indicates characteristics of d line (d-line), a short dashed line indicates characteristics of F line (F-line), and a long dashed line indicates characteristics of C line (C-line). Note that, in each lateral aberration diagram, a plane including the optical axis of first lens group G1 and the optical axis of second lens group G2 is employed as a meridional plane.

First Numerical Practical Example

Lens system 202A of the first numerical practical example corresponds to the first exemplary embodiment shown in FIG. 1. For the lens system of the first numerical practical example, surface data is shown in Table 1, various data is shown in Table 2, single lens data is shown in Table 3, lens group data is shown in Table 4, and lens group magnification is shown in Table 5.

Herein, magnification=10.0 and WD=21 are satisfied.

TABLE 1

(Surface Data)

| Surface number | r | d | nd | vd |
|---|---|---|---|---|
| Object surface | ∞ | | | |
| 1 | −29.89700 | 3.05000 | 2.00272 | 19.3 |
| 2 | −20.47000 | 0.70000 | | |
| 3 | 197.92800 | 2.59000 | 1.78472 | 25.7 |
| 4 | 61.30300 | 5.70000 | 1.49700 | 81.6 |
| 5 | −28.01700 | 0.70000 | | |
| 6 | 86.34800 | 3.61000 | 1.43700 | 95.1 |
| 7 | −79.02200 | 0.90000 | 1.75520 | 27.5 |
| 8 | 38.02400 | 5.57000 | 1.43700 | 95.1 |
| 9 | −42.53400 | variable | | |
| 10 (Aperture) | 55.31300 | 0.90000 | 1.69680 | 55.5 |
| 11 | 26.33600 | 6.73000 | 1.43700 | 95.1 |
| 12 | −36.93900 | 5.36300 | | |
| 13 | −35.21600 | 0.90000 | 1.80610 | 33.3 |
| 14 | −67.69100 | 2.84700 | | |
| 15 | −130.28200 | 0.90000 | 1.59270 | 35.4 |
| 16 | 22.29400 | 4.15000 | 2.00069 | 25.5 |
| 17 | 84.22300 | 3.74000 | | |
| 18 | −32.68200 | 0.90000 | 1.67270 | 32.2 |
| 19 | 501.53200 | 1.51000 | | |
| 20 | 46.79300 | 5.78000 | 1.49700 | 81.6 |
| 21 | −25.63200 | 0.90000 | 2.00069 | 25.5 |
| 22 | −37.85300 | 26.70900 | | |
| 23 | 31.81700 | 3.38000 | 1.75520 | 27.5 |
| 24 | ∞ | 21.83200 | | |
| 25 | −12.06500 | 0.90000 | 1.80420 | 46.5 |
| 26 | 188.98300 | BF | | |
| Image surface | ∞ | | | |

TABLE 2

(Various Data)

| | Far-object | Middle point | Near-object |
|---|---|---|---|
| d9 | 25.0000 | 15.0000 | 5.0000 |
| Focal length | 8.9012 | 8.7928 | 8.6870 |
| NA | 0.420 | 0.421 | 0.421 |
| BF | 72.77962 | 72.78726 | 72.79491 |

TABLE 3

(Single Lens Data)

| Lens elements | First surface | Focal length |
|---|---|---|
| 1 | 1 | 55.7171 |
| 2 | 3 | −114.1247 |
| 3 | 4 | 39.5276 |
| 4 | 6 | 95.0504 |
| 5 | 7 | −33.8807 |
| 6 | 8 | 46.9280 |
| 7 | 10 | −73.0784 |
| 8 | 11 | 36.3580 |
| 9 | 13 | −92.2016 |
| 10 | 15 | −32.0477 |
| 11 | 16 | 29.3160 |
| 12 | 18 | −45.5802 |
| 13 | 20 | 34.2281 |
| 14 | 21 | −82.3709 |
| 15 | 23 | 42.1306 |
| 16 | 25 | −14.0741 |

TABLE 4

(Lens Groups Data)

| Lens units | First surface | Focal length | Lens configuration length | Front principal point | Rear principal point |
|---|---|---|---|---|---|
| 1 | 1 | 27.97248 | 22.82000 | 6.89543 | 14.15710 |
| 2 | 10 | 258.09446 | 87.44100 | −558.67275 | −105.00343 |

TABLE 5

(Lens Groups Magnification)

| Lens groups | First surface | Far-object | Middle point | Near-object |
|---|---|---|---|---|
| 1 | 1 | 363.00744 | 363.00744 | 363.00744 |
| 2 | 10 | −0.02762 | −0.02765 | −0.02768 |

Second Numerical Practical Example

Lens system 202B of the second numerical practical example corresponds to the second exemplary embodiment shown in FIG. 4. For the lens system of the second numerical practical example, surface data is shown in Table 6, various data is shown in Table 7, single lens data is shown in Table 8, lens group data is shown in Table 9, and lens group magnification is shown in Table 10.

Herein, magnification=20.0 and WD=20 are satisfied.

TABLE 6

(Surface Data)

| Surface number | r | d | nd | vd |
|---|---|---|---|---|
| Object surface | ∞ | | | |
| 1(Aperture) | −27.73700 | 2.64480 | 2.00272 | 19.3 |
| 2 | −18.10030 | 0.70000 | | |
| 3 | −98.66480 | 0.70000 | 2.00100 | 29.1 |
| 4 | 141.28350 | 4.47550 | 1.49700 | 81.6 |
| 5 | −21.92530 | 0.70000 | | |
| 6 | 68.81930 | 4.53050 | 1.43700 | 95.1 |
| 7 | −28.00730 | 0.90000 | 1.75520 | 27.5 |
| 8 | 2351.52180 | 3.57870 | 1.43700 | 95.1 |
| 9 | −32.00040 | variable | | |
| 10 | 61.36920 | 1.96360 | 1.58913 | 61.3 |
| 11 | 28.94110 | 5.20440 | 1.43700 | 95.1 |
| 12 | −40.73400 | 13.00640 | | |
| 13 | −33.63150 | 0.70000 | 1.80420 | 46.5 |
| 14 | −63.63150 | 3.50000 | | |
| 15 | −31.46310 | 0.90000 | 1.59270 | 35.4 |
| 16 | 36.10780 | 2.48510 | 2.00069 | 25.5 |
| 17 | 128.62480 | 2.00000 | | |
| 18 | 63.02140 | 1.95350 | 1.43700 | 95.1 |
| 19 | 144.95240 | 2.30000 | | |
| 20 | 44.20270 | 3.39820 | 1.49700 | 81.6 |
| 21 | −42.10050 | 0.90000 | 2.00100 | 29.1 |
| 22 | −72.09960 | 52.98250 | | |
| 23 | 37.98940 | 3.30850 | 1.68893 | 31.2 |
| 24 | −12.78280 | 0.76800 | 1.71300 | 53.9 |
| 25 | 54.98230 | 21.54050 | | |
| 26 | −10.50900 | 0.70000 | 1.80420 | 46.5 |
| 27 | −202.95580 | BF | | |
| Image surface | ∞ | | | |

TABLE 7

(Various Data)

| | Far-object | Middle point | Near-object |
|---|---|---|---|
| d9 | 22.0000 | 12.0000 | 2.0000 |
| Focal length | 3.4403 | 3.4372 | 3.4341 |
| NA | 0.420 | 0.420 | 0.420 |
| BF | 55.71865 | 55.78452 | 55.85032 |

TABLE 8

(Single Lens Data)

| Lens elements | First surface | Focal length |
|---|---|---|
| 1 | 1 | 45.6792 |
| 2 | 3 | −57.9518 |
| 3 | 4 | 38.5400 |
| 4 | 6 | 46.2092 |
| 5 | 7 | −36.6435 |
| 6 | 8 | 72.2772 |
| 7 | 10 | −95.1029 |
| 8 | 11 | 39.6179 |
| 9 | 13 | −89.6342 |
| 10 | 15 | −28.2266 |
| 11 | 16 | 49.5002 |
| 12 | 18 | 253.3058 |
| 13 | 20 | 43.9612 |
| 14 | 21 | −102.6228 |
| 15 | 23 | 14.2622 |
| 16 | 24 | −14.4780 |
| 17 | 26 | −13.8036 |

TABLE 9

(Lens Groups Data)

| Lens units | First surface | Focal length | Lens configuration length | Front principal point | Rear principal point |
|---|---|---|---|---|---|
| 1 | 1 | 26.62465 | 18.22950 | 6.73274 | 12.56773 |
| 2 | 10 | 1432.39109 | 117.61070 | −9653.95663 | −1142.77113 |

TABLE 10

(Lens Groups Magnification)

| Lens Groups | First surface | Far-object | Middle point | Near-object |
|---|---|---|---|---|
| 1 | 1 | −246.31079 | −246.31079 | −246.31079 |
| 2 | 10 | 0.08119 | 0.08114 | 0.08109 |

Third Numerical Practical Example

Lens system 202C of the third numerical practical example corresponds to the third exemplary embodiment shown in FIG. 7. For the lens system of the third numerical practical example, surface data is shown in Table 11, various data is shown in Table 12, single lens data is shown in Table 13, lens group data is shown in Table 14, and lens group magnification is shown in Table 15.

Herein, magnification=20.0 and WD=22.8561 are satisfied.

TABLE 11

(Surface Data)

| Surface number | r | d | nd | vd |
|---|---|---|---|---|
| Object surface | ∞ | | | |
| 1(Aperture) | −34.80340 | 3.01600 | 1.91833 | 20.5 |
| 2 | −20.05840 | 0.70000 | | |
| 3 | 46.25480 | 2.00000 | 1.98376 | 29.9 |
| 4 | 36.35470 | 5.43200 | 1.46107 | 79.4 |
| 5 | −32.25030 | 0.70000 | | |
| 6 | 144.93480 | 4.57420 | 1.49417 | 79.4 |
| 7 | −24.80090 | 0.90000 | 1.77422 | 29.1 |
| 8 | 44.06130 | 4.50440 | 1.44477 | 84.8 |
| 9 | −42.28600 | variable | | |
| 10 | 40.93120 | 5.38670 | 1.58167 | 65.2 |
| 11 | −28.41440 | 0.90000 | 1.43700 | 95.1 |
| 12 | −428.43920 | 5.05160 | | |
| 13 | −40.03140 | 0.90000 | 1.59710 | 34.1 |
| 14 | 21.62640 | 3.97080 | 1.96636 | 26.6 |
| 15 | −469.64830 | 7.32910 | | |
| 16 | 140.66710 | 2.00000 | 2.00272 | 19.3 |
| 17 | 26.68760 | 2.00000 | | |
| 18 | 32.99750 | 3.23420 | 1.47161 | 84.5 |
| 19 | −18.26580 | 0.90000 | 2.00100 | 29.1 |
| 20 | −78.18520 | 50.34570 | | |
| 21 | 15.99500 | 2.40770 | 1.65474 | 28.7 |
| 22 | −17.97450 | 0.70000 | 1.67925 | 55.5 |
| 23 | 28.79800 | 12.47360 | | |
| 24 | −14.11760 | 0.90000 | 1.61800 | 63.4 |
| 25 | 23.14050 | BF | | |
| Image surface | ∞ | | | |

TABLE 12

(Various Data)

| | Far-object | Middle point | Near-object |
|---|---|---|---|
| d9 | 28.6452 | 18.6452 | 8.6452 |
| Focal length | 3.9876 | 3.9813 | 3.9749 |
| NA | 0.420 | 0.421 | 0.421 |
| BF | 64.62021 | 64.66149 | 64.70272 |

TABLE 13

(Single Lens Data)

| Lens elements | First surface | Focal length |
|---|---|---|
| 1 | 1 | 46.9576 |
| 2 | 3 | −191.8815 |
| 3 | 4 | 38.0157 |
| 4 | 6 | 43.2397 |
| 5 | 7 | −20.3804 |
| 6 | 8 | 49.3062 |
| 7 | 10 | 29.6816 |
| 8 | 11 | −69.6876 |
| 9 | 13 | −23.3875 |
| 10 | 14 | 21.4794 |
| 11 | 16 | −33.1380 |
| 12 | 18 | 25.4449 |
| 13 | 19 | −23.9903 |
| 14 | 21 | 13.2996 |
| 15 | 22 | −16.1950 |
| 16 | 24 | −14.0584 |

TABLE 14

(Lens Groups Data)

| Lens units | First surface | Focal length | Lens configuration length | Front principal point | Rear principal point |
|---|---|---|---|---|---|
| 1 | 1 | 26.69952 | 21.82660 | 3.92921 | 11.00293 |
| 2 | 10 | 937.68470 | 98.49940 | −5353.46494 | −714.29527 |

TABLE 15

(Lens Groups Magnification)

| Lens Groups | First surface | Far-object | Middle point | Near-object |
|---|---|---|---|---|
| 1 | 1 | −311.24982 | −311.24982 | −311.24982 |
| 2 | 10 | 0.06428 | 0.06423 | 0.06419 |

The corresponding values for each condition in the lens systems of the respective numerical practical examples are shown in the following table 16.

TABLE 16

| | Conditions | Numerical practical examples | | |
|---|---|---|---|---|
| | | 1 | 2 | 3 |
| (1) | \| fg1/WD \| | 1.33 | 1.33 | 1.17 |
| (2) | \| fg2/f \| | 29.0 | 416.4 | 235.2 |
| (3) | ndA | 2.00 | 2.00 | 1.92 |
| (4) | vdA | 19.3 | 19.3 | 20.5 |
| (5) | (R1A + R2A)/(R1A − R2A) | 5.34 | 4.76 | 3.72 |
| (6) | t2max/tg2 | 0.31 | 0.45 | 0.51 |
| (7) | fg1/fL | −1.99 | −1.93 | −1.90 |

As mentioned above, exemplary embodiments are described as an example of the art in the present disclosure. To achieve the above purpose, the accompanying drawings and the detailed description are provided.

Accordingly, the components described in the accompanying drawings and the detailed description may include not only components essential for solving the problem but also components that are not essential for solving the problem in order to illustrate the technique. Therefore, even when the unessential components are described in the accompanying drawings and the detailed description, they do not have to be recognized as being essential.

Further, since the above exemplary embodiments illustrate the art in the present disclosure, various modifications, substitutions, additions and omission can be performed within the scope of claims and equivalent scope of claims.

INDUSTRIAL APPLICABILITY

The present disclosure is applicable to a microscope, a digital still camera, a digital camcorder, a camera of mobile information terminal such as a smart phone, a camera of Personal Digital Assistance (PDA), a monitoring camera in a monitoring system, a Web camera, an in-vehicle camera, and the like. Especially, the present disclosure is applicable to a photography optical system required for high definition, such as a microscope photography system, a digital still camera system, and a digital video camera system.

What is claimed is:

1. A lens system comprising:
a first lens group that is moved toward an image side along an optical axis in focusing from a far-object in-focus state to a near-object in-focus state, and has positive optical power; and
a second lens group that is disposed on the image side relative to the first lens group and has optical power,
wherein
the following conditions (1) and (2) are satisfied:

$$0.5 < |fg1/WD| < 2.0 \tag{1}$$

$$20 < |fg2/f| < 700 \tag{2}$$

where
fg1 is a focal length of the first lens group,
WD is a distance, on the optical axis, from an object surface to a lens surface located closest to an object side of the first lens group,
fg2 is a focal length of the second lens group, and
f is a focal length of the lens system under the far-object in-focus state.

2. The lens system according to claim 1, comprising a cemented lens constituted by three lens elements in the first lens group.

3. The lens system according to claim 1, wherein
a first lens element included in the first lens group and disposed closest to the object side, satisfies the following conditions (3) and (4):

$$1.7 < ndA < 2.5 \tag{3}$$

$$13 < vdA < 45 \tag{4}$$

where
ndA is a refractive index of the first lens element at d line, and
vdA is an Abbe number of the first lens element at the d line.

4. The lens system according to claim 1, wherein
a first lens element disposed closest to the object side of the first lens group has a positive meniscus shape with a convex surface facing the image side, and satisfies the following condition (5):

$$1<(R1A+R2A)/(R1A-R2A)<15 \tag{5}$$

where
R1A is a curvature radius of a surface on the object side of the first lens element, and
R2A is a curvature radius of a surface on the image side of the first lens element.

5. The lens system according to claim 1, wherein
the second lens group satisfies the following condition (6):

$$0.1<t2max/tg2<0.8 \tag{6}$$

where
t2max is a maximum value of distances, on the optical axis, between lens elements in the second lens group, and
tg2 is a distance, on the optical axis, from a lens surface located closest to the object side of the second lens group, to a lens surface located closest to the image side of the second lens group.

6. The lens system according to claim 1, wherein
the focal length of the first lens group, and a focal length of a first lens element included in the first lens group and disposed closest to the object side, satisfy the following condition (7):

$$-3<fg1/fL<-1 \tag{7}$$

where
fg1 is the focal length of the first lens group, and
fL is the focal length of the first lens element.

7. An interchangeable lens device comprising:
the lens system according to claim 1; and
a lens mount part capable of connecting to a camera body including an image element for receiving an optical image formed by the lens system and converting the optical image into an electric image signal.

8. A camera system comprising:
an interchangeable lens device including the lens system according to claim 1; and
a camera body that is detachably connected to the interchangeable lens device via a camera mount part and includes an image element for receiving an optical image formed by the lens system and converting the optical image into an electric image signal.

* * * * *